April 3, 1928.

G. J. TRIGONIS

WINDOW SEAT

Filed June 4, 1926

1,664,470

Inventor.
G. J. Trigonis
By Victor J. Evans
Attorney.

Patented Apr. 3, 1928.

1,664,470

UNITED STATES PATENT OFFICE.

GEORGE J. TRIGONIS, OF SAN FRANCISCO, CALIFORNIA.

WINDOW SEAT.

Application filed June 4, 1926. Serial No. 113,762.

This invention relates to improvements in window seats, and has particular reference to that type of window seat commonly employed for the washing of windows on the outside of a building.

The principal object of this invention is to provide a device which is adjustable so as to fit the window sill regardless of its width.

Another object is to produce a device of this character which will permit the window washer to work without fear of accidental falls.

Another object is to provide a device of this character which is simple in construction, neat in appearance and cheap to manufacture.

Other objects and advantages will be apparent during the course of the following description.

In the accompanying drawing forming a part of this specification, and in which like numerals are employed to designate like parts throughout the same, Figure 1 is a side elevation of my improved window seat as the same would appear in use, the window sill being shown in cross-section, Figure 2 is a top plan view of Figure 1, with the rubber coverings omitted.

I am aware of the fact that window seats have been heretofore employed for the same purpose as my device. These seats, however, in most instances have been complicated, expensive to manufacture and exceedingly bulky, which precluded their being rapidly moved from window to window.

Figure 1:
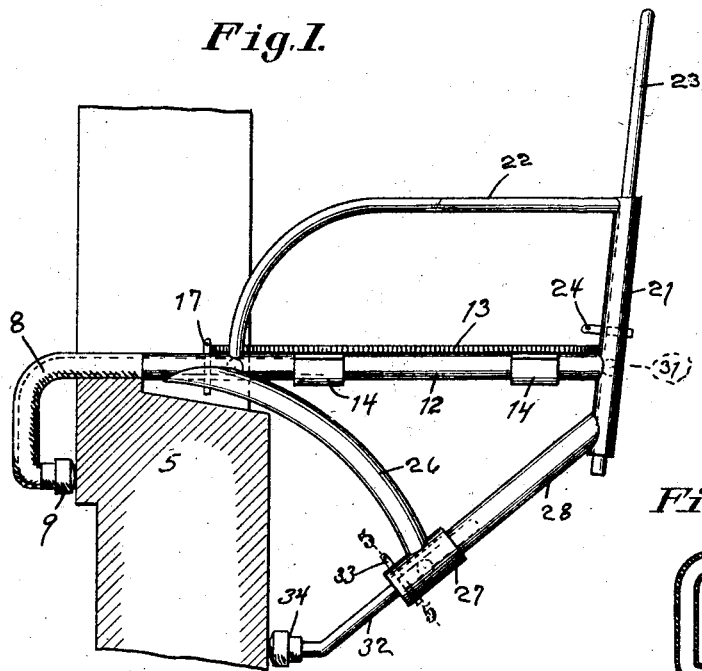
Figure 3:
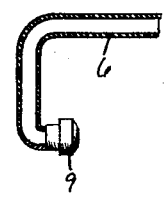
Figure 3 is a fragmentary detail view of the sill engaging member.
Figure 2:
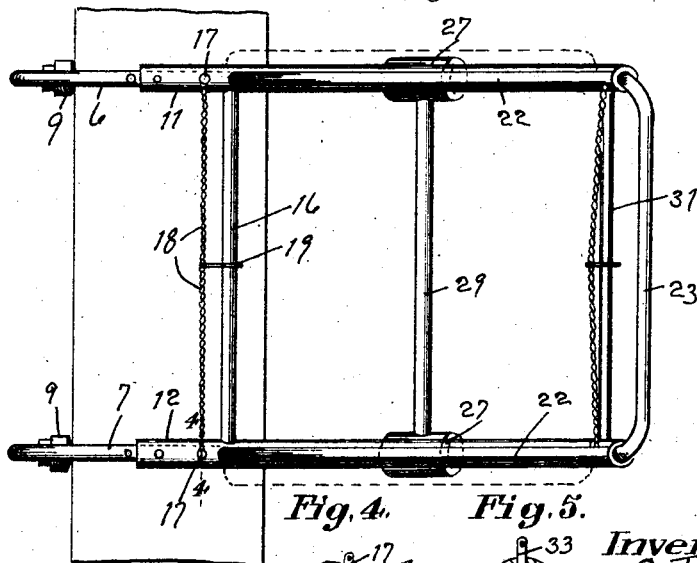
Figures 4, 5:
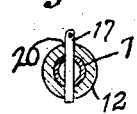
Figure 4 is a cross-section taken on the line 4—4 of Figure 2.
Figure 5 is a cross-section taken on the line 5—5 of Figure 1.

To overcome these difficulties I have produced my present device in which the numeral 5 designates a window sill, over which the hooked extremities 6 and 7 of my device are placed. These extremities are covered with a rubber material as shown at 8 in Figure 1, for the purpose of protecting the window sill. At the same time, a rubber buffer is positioned upon the ends of the hooked extremities as indicated at 9. These buffers serve to prevent the marring of the interior of the building.

The hooked extremities 6 and 7 are adapted to be telescoped by parallel tubular members 11 and 12 which carry a seat 13 secured by clips 14. A spacer is also shown at 16 for more rigidly holding the device together.

At 17 I have shown pins which are attached by chains 18 to a ring 19 slidable upon the spacer. These pins pass through suitable openings in the tubular members 11 and 12 and through similar openings in the hooked extremities 6 and 7.

This construction permits the hooked extremities 6 and 7 to be adjusted with respect to the tubular members.

Secured to the rear end of the tubular members 11 and 12 are uprights 21 to the ends of which uprights, handles 22 are secured, the opposite end of these handles being in turn secured to the tubular members 11 and 12.

A vertically adjustable U-shaped member 23 serves as a back rest and is adjusted through the medium of pins 24 passing through openings in the uprights 21. At 26, I have shown a downwardly curved brace to one end of which is secured the tubular member 12, and to the opposite end a sleeve 27 within which one end of a brace 28 is secured. The opposite end of this brace is secured to the lower extremity of the upright 21. A cross brace is shown at 29 and extends between the sleeves 27. A similar cross brace is shown at 31 and extends between the uprights 21.

Telescoping legs 32 are slidably held in the braces 28 as by pins 33. These legs 32 carry rubber tips 34, the purpose of which is obvious.

It will thus be seen that I have produced a device which will accomplish all the objects above set forth in an efficient manner.

It is to be understood that the form of my invention herewith shown and described is to be taken as a preferred example of the same and that various changes relative to the shape, size and arrangement of parts may be resorted to without departing from the spirit of the invention or the scope of the subjoined claim.

Having thus described my invention, I claim:—

In a window seat, a pair of tubular spaced members, hooked members slidably engaged in said tubular members, means for maintaining said hooked members in adjusted position, vertically disposed tubular members secured to said first mentioned tubular members, a U-shaped back rest, vertically adjustably held in said upright members, and legs slidably secured to said device, for the purpose specified.

In testimony whereof I affix my signature.

GEORGE J. TRIGONIS.